United States Patent

Okada et al.

[15] 3,705,363

[45] Dec. 5, 1972

[54] CONTROL SIGNAL GENERATOR WITH SELECTIVELY SWITCHABLE DURATION CONTROL CIRCUIT

[72] Inventors: Hisao Okada, Kanagawa; Koji Morita, Tokyo, both of Japan

[73] Assignee: Sony Corporation, Tokyo, Japan

[22] Filed: Sept. 24, 1971

[21] Appl. No.: 183,511

[30] Foreign Application Priority Data

Sept. 26, 1970 Japan ....................45/95471
Sept. 26, 1970 Japan ....................45/95472

[52] U.S. Cl...........331/174, 178/DIG. 15, 331/185, 340/167 A, 340/171

[51] Int. Cl...........H03b 3/18

[58] Field of Search..........331/172, 173, 174, 185; 178/DIG. 15; 340/167 R, 169, 171, 167 A; 325/390, 391, 392; 343/228

[56] References Cited

UNITED STATES PATENTS

| | | | |
|---|---|---|---|
| 2,974,293 | 3/1961 | Fryklund | 331/174 X |
| 3,112,486 | 11/1963 | Adler | 325/391 X |

*Primary Examiner*—Roy Lake
*Assistant Examiner*—Siegfried H. Grimm
*Attorney*—Lewis H. Eslinger et al.

[57] ABSTRACT

A transmitter for producing control signals of precisely predetermined duration, for example, for remote control of a television receiver or other apparatus, has an oscillator operable to generate a signal, a switching transistor operable to connect the oscillator with an operating voltage source, and a switching assembly selectively operable to cause operation of the switching transistor and also to determine the charging time constant of a charging circuit by which the period of operation of the oscillator is controlled.

13 Claims, 15 Drawing Figures

INVENTOR
HISAO OKADA
KOJI MORITA

INVENTOR
HISAO OKADA
KOJI MORITA

INVENTOR
HISAO OKADA
KOJI MORITA

INVENTOR
HISAO OKADA
BY KOJI MORITA

CONTROL SIGNAL GENERATOR WITH SELECTIVELY SWITCHABLE DURATION CONTROL CIRCUIT

This invention relates generally to signal transmitters, and more particularly to apparatus for transmitting signals of predetermined duration by which a remotely disposed apparatus may be controlled.

Remote control systems have been proposed in which a control signal receiver is provided in an apparatus to be controlled and a control signal is transmitted to the receiver, at a certain distance therefrom, to control the apparatus. For example, in the case of the remote control of sound volume or channel selection in television receivers, a signal having a certain frequency, for example, an ultrasonic wave signal of approximately 40 KHz, is transmitted and the duration of this signal is changed for controlling the sound volume or selecting a desired channel. In such a case, it is necessary, in order to prevent erroneous operations, to transmit an ultrasonic wave signal of accurate duration for each particular control. Generally, for achieving various kinds of controls, the control signals are of short duration, for example, 25 milliseconds, 35 milliseconds, 45 milliseconds, – and close to each other, so that a minor error in the duration of any control signal may cause an erroneous operation. The duration of each of these control signals is determined by a time constant circuit and usually changed by varying the time constant of that circuit. Typically, a control signal transmitter consists of an oscillator operative to produce an ultrasonic wave signal of a certain frequency, a time constant circuit for limiting the operation of the oscillator to a period of time corresponding to the duration of a desired control signal, an operating voltage source for operating the oscillator and a plurality of change-over switches which are required to select the time constant of the aforementioned time constant circuit and also to control the supplying of the operating voltage from the source to the oscillator. Since such a transmitter is normally adapted to be operable by a battery so as to be portable in use, it is absolutely necessary to halt the power supply to the oscillator for minimizing power consumption when the transmitter is not actually in use. The on-off operation of the voltage source and the switching of the time constant circuit should be carried out simultaneously, and a plurality of ganged mechanical switches have heretofore been employed for these purposes. However, even though the switches are ganged with each other, a slight error or delay may exist between the operations of the switches to interfere with the correct operation of the oscillator, so that the latter does not provide a constrol signal of precisely the desired duration, thus making it impossible to control an associated apparatus with accuracy. Further, the use of such ganged switches inevitably leads to complexity in the construction of the transmitter.

Accordingly, it is an object of this invention to provide a transmitter for transmitting control signals for the remote control of an apparatus, and in which the above mentioned disadvantages of previously proposed transmitters for this purpose are avoided.

Another object of this invention is to provide a transmitter for use in a remote control system and which transmits control signals of accurately predetermined duration to an apparatus to be remotely controlled thereby.

Still another object of this invention is to provide a transmitter of relatively simple construction which is adapted to transmit control signals of accurately predetermined duration for remote control of an apparatus.

In accordance with an aspect of this invention, a transmitter for producing control signals of precisely predetermined duration, for example, for remote control of a television receiver or other apparatus, includes an oscillator operable to generate a predetermined signal, for example, a signal of a determined frequency, and which is connected with an operating voltage source by way of a switching transistor, and a switching assembly is connected with the switching transistor to operate the latter and further to determine the charging time constant of a charging circuit in response to the selective operation of the switching assembly, with the period of operation of the oscillator being precisely controlled in accordance with the determined charging time constant.

In preferred embodiments of the invention, the charging circuit includes a plurality of resistors connected in series with a capacitor and one or more of which is interposed in the charging circuit of the capacitor in accordance with the selective operation of the switching assembly. Further, it is desirable that the oscillator be operated to produce a signal of a duration equal to the time required for charging of the capacitor up to a predetermined potential, and that a discharging circuit be provided for discharging the capacitor upon the conclusion of operation of the switching assembly.

The above and other objects features and advantages of the invention will be apparent in the following detailed description of illustrated embodiments thereof which is to be read in connection with the accompanying drawings wherein.

Figure 1:
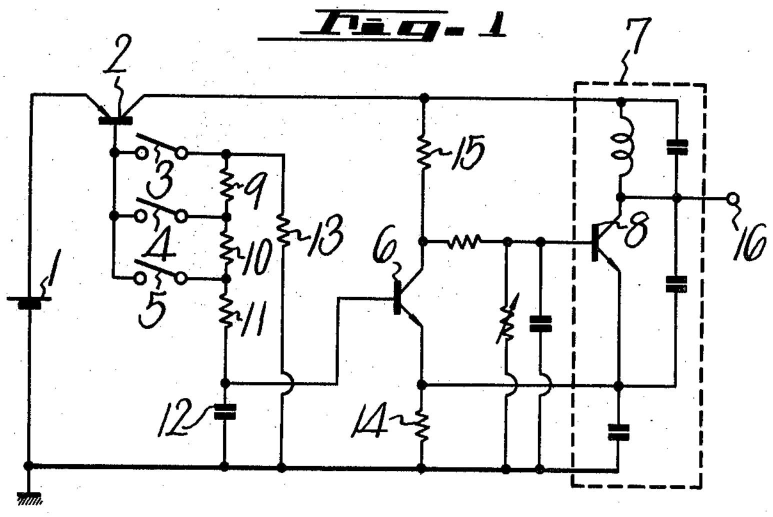
FIG. 1 is a circuit diagram showing one embodiment of a transmitter according to the present invention.

Referring to FIG. 1 in detail, it will be seen that a transmitter according to one embodiment of the present invention includes a DC voltage source 1, such as a dry cell or a rechargeable battery and a pnp-type transistor 2 serving as a voltage source switch. The emitter of transistor 2 is connected to the positive terminal of voltage source 1 and the base of the transistor is connected to contacts at one side of a plurality of switches, for example, three normally open switches 3,4 and 5. The other contact of switch 3 is connected to the negative terminal of voltage source 1 through a series circuit of resistors 9,10 and 11 and a capacitor 12 and the other contacts of switches 4 and 5 are connected to the juncture between resistors 9 and 10 and to the juncture between resistors 10 and 11, respectively. The juncture between switch 3 and resistor 9 is connected to the negative terminal of voltage source 1 through a resistor 13 for rendering transistor 2 sufficiently conductive. In this case, resistors 9,10 and 11 and capacitor 12 form a current charging circuit.

The transmitter according to the invention further includes a switching transistor 6 which is controlled by the current charging circuit and which has its base connected to the juncture between resistor 11 and capacitor 12, its emitter connected to the negative terminal of voltage source 1 through a resistor 14, and its collector connected to the collector of transistor 2 through a resistor 15.

An oscillating transistor 8 is included in an oscillator 7 which generates an ultrasonic wave signal of, for example, 40 KHz. The collector current of transistor 8 is supplied from the collector of transistor 2 and the base current is supplied from the collector of transistor 6. Reference numeral 16 designates an output terminal of oscillator 7 and the oscillating output therefrom is supplied to an electro-acoustic transducer (not shown), if necessary through an amplifier, to be converted into an ultrasonic wave. The electric power necessary for operating the amplifier may be derived from between the collector of transistor 2 and the negative terminal of voltage source 1.

In the above described circuit, when, for example, switch 3 is turned on or closed, a charging current flows through the emitter and base of the transistor 2 to the current charging circuit consisting of resistors 9, 10 and 11 and capacitor 12 to turn on transistor 2, thereby supplying a collector voltage to transistors 6 and 8. Concurrently, due to the flow of the charging current in the current charging circuit, the base potential of transistor 6 gradually increases in accordance with the time constant determined by the series connection of resistors 9, 10 and 11 and capacitor 12, as shown by curve 18*a* on FIG. 2A. However, the base potential does not reach the potential $V_0$ which turns on the transistor 6 before a time $t_1$, so that transistor 6 remains nonconductive until the time $t_1$. Accordingly, a base bias is supplied from the collector of transistor 6 to transistor 8 to start the oscillation of the oscillator 7 at the time $t_o$ when switch 3 is closed.

When the charging current flowing in the current charging circuit raises the base potential of transistor 6 to the value $V_0$ at the time $t_1$, transistor 6 is turned on to lower its collector potential, so that transistor 8 is turned off to stop its oscillation at the time $t_1$. Accordingly, there is derived at the output terminal 16 an ultrasonic control signal of 40 KHz, such as shown on FIG. 2B, which lasts for a predetermined period from the time $t_o$ when the switch 3 is closed to the time $t_1$ when the base potential of the transistor 6 reaches the potential $V_0$.

Figure 2A:
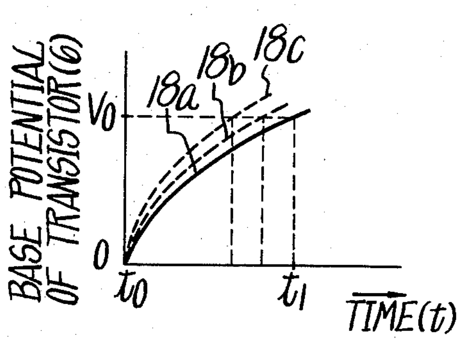
FIGS. 2A and 2B and FIGS. 3A, 3B and 3C are waveform diagrams to which reference will be made in explaining the present invention.
Figure 2B:
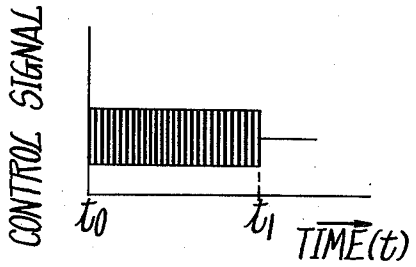

Similarly, when the switch 4 is closed, capacitor 12 is charged through resistors 10 and 11, so that the base potential of transistor 6 increases and attains the potential $V_0$ more rapidly than in the case of the closing of switch 3, for example, as shown by the curve 18*b* on FIG. 2A. Accordingly, closing of switch 4 produces a control signal of shorter duration than closing of switch 3. In a similar manner, closing of switch 5 increases the base potential of transistor 6 at the rate shown by curve 18*c* on FIG. 2A to provide a control signal of still shorter duration. Therefore, by selectively actuating switches 3,4 and 5, it is possible to obtain control signals having durations of, for example, 35, 25 and 15 milliseconds, respectively. Thus, a control signal of predetermined duration can be obtained by selectively operating the switches. Such a control signal is received by, for example, a remote-control channel selector (not shown) in the television receiver in which the capacitance value of a variable capacitance diode is altered according to the duration of the control signal to achieve corresponding channel selection.

As will be apparent from the foregoing, the transmitter according to the present invention employs the combination of the switching transistors and mechanical switches for preventing the time lag which often occurs when using ganged mechanical switches, thus ensuring a control signal of predetermined duration, so that, for example, channel selection of a television receiver can be reliably controlled. Further, the switch mechanism itself can be miniaturized to permit reduction of the size of the transmitter. In addition, the transmitter according to this invention has relatively fewer mechanical switch contacts, and hence is advantageously more reliable, longer-lived and more economical than the previously existing transmitters of the described type.

Figures 3A, 3B, 3C:
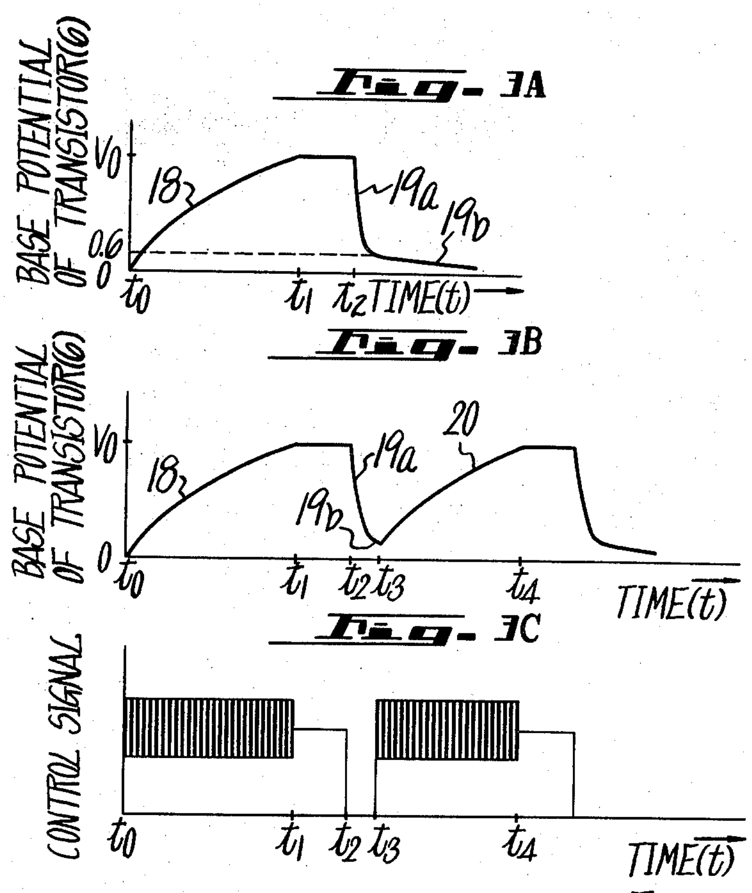

However, in the embodiment shown in FIG. 1, after any one of the switches, for example, the switch 3, is turned off or opened, the charge stored in capacitor 12 is rapidly discharged through the base and emitter of transistor 6 down to the offset voltage 0.6V between the base and emitter but the charge corresponding to that offset or forward voltage is thereafter only gradually discharged in accordance with a large time constant. More specifically, when switch 3 is opened at a time $t_2$, the charge stored in the capacitor 12 is quickly discharged through the base and emitter of transistor 6 and the resistor 14, as shown by curve 19*a* on FIG. 3A. When the voltage of the capacitor 12 decreases down to the offset voltage of 0.6V, transistor 6 is turned off and the remaining charge is gradually discharged through resistors 11,10,9 and 13, as shown by the curve 19*b* on FIG. 3A. Accordingly, when the switch 3 is opened at the time $t_2$, and then any one of the switches is immediately thereafter turned on at a time $t_3$, the charge stored in capacitor 12 at the time of opening of switch 3 is not completely discharged by the time $t_3$, as above described, and next rising of the base potential of transistor 6 starts from a level somewhat above the zero level, as indicated by curve 20 on FIG. 3B. Thus, the base potential of transistor 6 reaches level $V_0$ at a time $t_4$ to turn on the transistor 6, thereby providing, at output terminal 16, a control signal, such as is depicted in FIG. 3C, which lasts from the time $t_3$ to the time $t_4$. In this case, however, since the charging curve 20 of the second output signal does not start from the zero level, it relatively rapidly reaches the level $V_o$ at which transistor 6 is turned on, as compared with the case where the charging current starts from the zero level, and the transmitted control signal has a duration ($t_4$–$t_3$) which is shorter than the predetermined or desired duration to cause erroneous operation of the controlled device, for example, to cause the remotely controlled television receiver to receive a channel other than a desired one.

Figure 4:
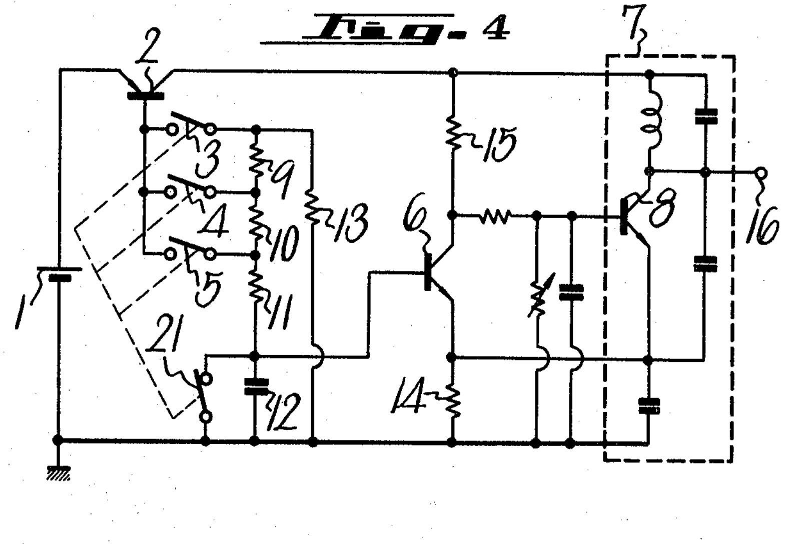
FIG. 4 is a circuit diagram showing another embodiment of the transmitter according to the present invention.

FIG. 4 shows another embodiment of this invention which avoids the above problem. In this embodiment, the transmitter of FIG. 1 is further provided with a switch for discharging the charge stored in capacitor 12 when the voltage source is cut off. More specifically, as shown, a switch 21 ganged with switches 3,4 and 5 is connected in parallel with capacitor 12. This switch 21 is opened when any of the switches 3, 4 and 5 is closed, and switch 21 is closed when all of switches 3,4 and 5 are opened, as shown. With such an arrangement, when, for example, switch 3 is closed, switch 21 is opened and a charging current flows in the base of transistor 2 to derive, at the output terminal 16, a control signal which has a predetermined duration, for example, of 37 milliseconds. Upon opening of switch 3, switch 21 is closed to immediately discharge all the charge stored in capacitor 12, and accordingly even when another switch, for example, the switch 4 is closed following opening of the switch 3, a control signal having a predetermined duration, for example, of 25 milliseconds, is similarly obtained. Therefore, there is no possibility of the erroneous operation described above with references to FIGS. 1 and 3B.

Figure 5:
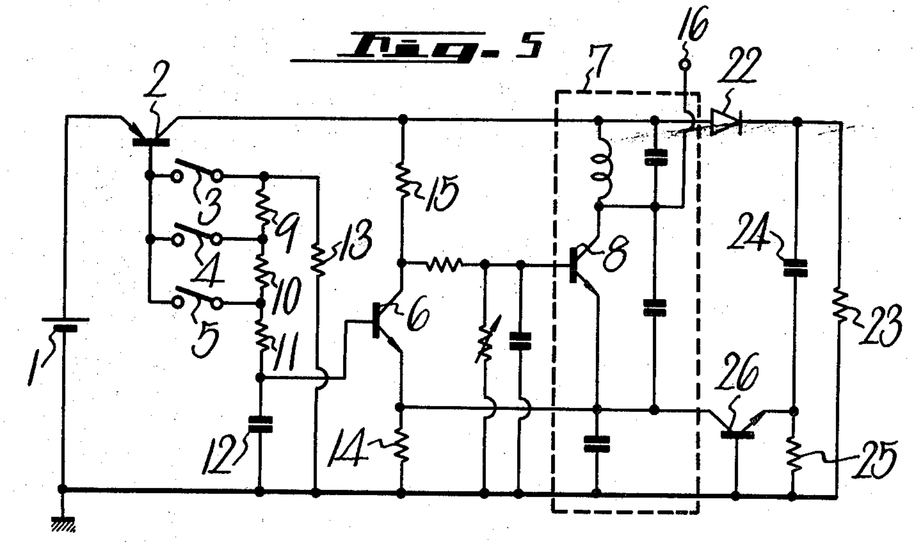
FIG. 5 is a circuit diagram showing a further embodiment of the transmitter according to the present invention.

FIG. 5 illustrates another embodiment of the present invention generally similar to that of FIG. 1, but in which the collector of transistor 2 is connected to the anode of a diode 22 for preventing a reverse current. The cathode of diode 22 is connected to the negative terminal of voltage source 1 through a resistor 23 and also through a capacitor 24 and a resistor 25 in parallel with resistor 23. An npn-type transistor 26 is also provided with its emitter connected to the juncture between capacitor 24 and resistor 25, its base connected to the negative terminal of voltage source 1 and its collector connected to the interconnected emitters of transistor 6 and transistor 8 which constitutes oscillator 7. The charging time constant of capacitor 24 is selected to be greater than that of capacitor 12.

Figure 6:
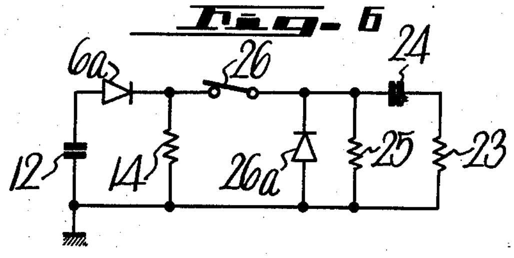
FIG. 6 is an equivalent circuit diagram to which reference will be made in explaining the operation of the embodiment of FIG. 5.
Figure 7:
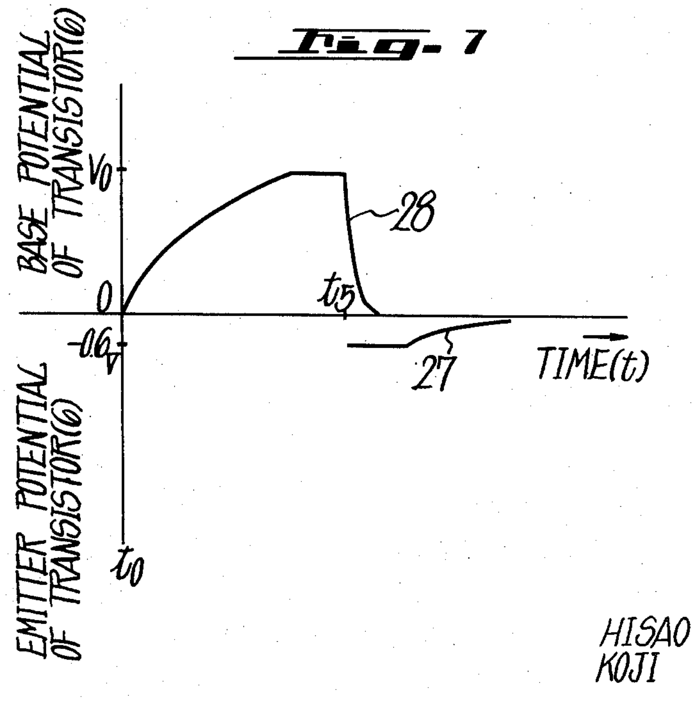
FIG. 7 is a waveform diagram to which reference will be made in explaining the operation of the embodiment of FIG. 5.

With the arrangement described with reference to FIG. 5, when a switch, for example, the switch 5, is closed at the time $t_o$, a control signal of a predetermined duration (for example, 15 milliseconds) is obtained at output terminal 16 in the same manner as has been described in respect to the transmitters shown in FIGS. 1 and 4. Moreover, when switch 5 is closed, capacitor 24 is charged, and transistor 26 is reversely biased and held in its nonconductive state. Next, when the switch 5 is opened at a time $t_5$, the electric charge stored in capacitor 24 is discharged through resistors 23 and 25 to produce a potential drop across resistor 25, by which transistor 26 is made conductive. In the equivalent circuit of FIG. 6, there is shown a diode 26*a* which equivalently represents the base-emitter of transistor 26, and the cathode voltage of diode 26*a* is assumed to be –0.6V while the emitter voltage of transistor 6 is assumed to be clamped at –0.6V, as indicated by curve 27 on FIG. 7. Accordingly, if the base-emitter of transistor 6 while conductive is equivalently represented by a diode 6*a* in FIG. 6, the cathode voltage of such diode 6*a* becomes –0.6V, so that the electric charge stored in capacitor 12 is all discharged instantaneously. Thus, for example, as indicated by curve 28 in FIG. 7, the capacitor 12 is discharged at a time constant determined by the resistors 14, 23 and 25 connected in parallel to capacitor 12.

It will be seen from the above that, in the embodiment of FIG. 5, the charge stored in capacitor 12 may be discharged at an extremely small time constant, that is, all discharged in a very short time, so that even when switches 3,4 and 5 are successively turned on and off, control signals having the predetermined durations can be obtained. Further, since the charging time constant of capacitor 24 is selected to be greater than that of capacitor 12, the charge stored in the capacitor 12 is surely discharged. It is also to be noted that the embodiment shown in FIG. 5 does not employ any additional mechanical switches, such as the switch 21 used in the embodiment of FIG. 4, and hence is highly reliable and long-lived.

Figure 8:
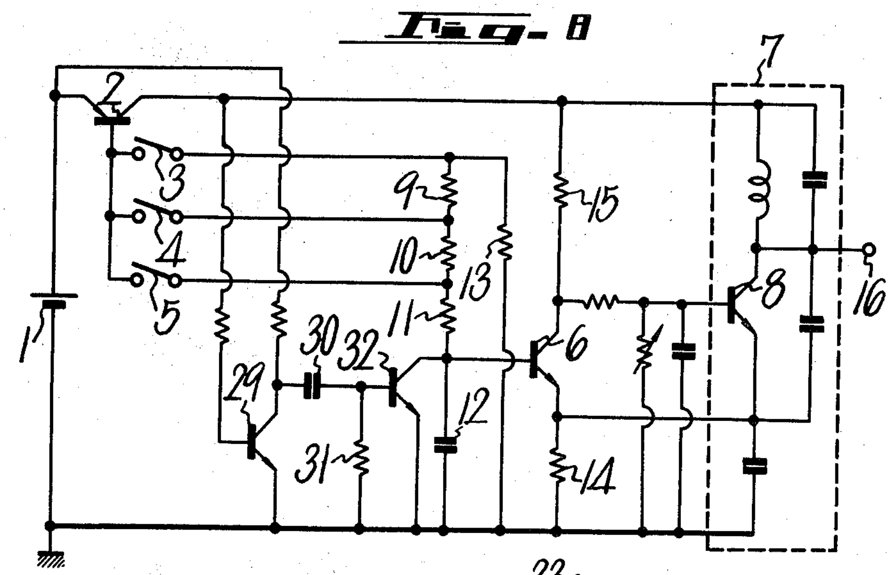
FIG. 8 is a circuit diagram showing still another embodiment of the transmitter according to the resent invention.

FIG. 8 illustrates still another embodiment of the present invention similar to the transmitter of FIG. 1, and in which a transistor 29 is provided with its base connected to the collector of transistor 2 through a resistor, its collector connected to the positive terminal of voltage source 1 through a resistor and its emitter connected to the negative terminal of source 1. Further, the collector of transistor 29 is connected to the base of a transistor 32 through a differentiation circuit consisting of a capacitor 30 and a resistor 31, and the collector and emitter of transistor 32 are connected in parallel to the capacitor 12.

Figures 9A, 9B, 9C, 9D:
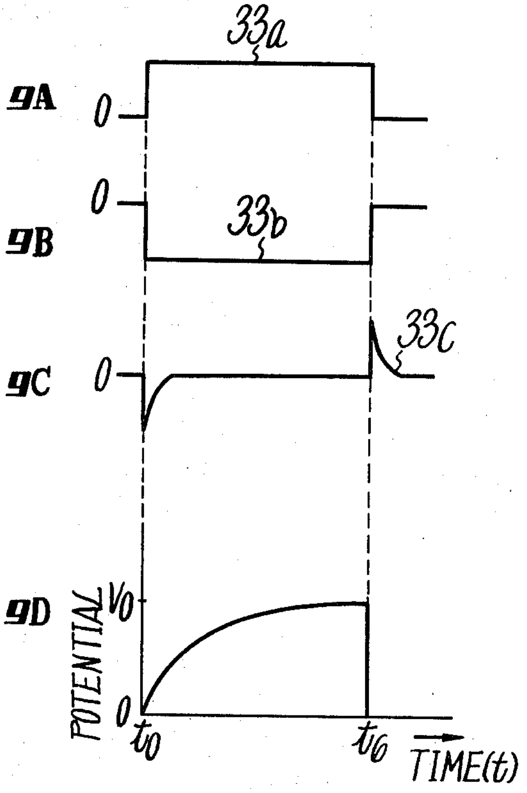
FIGS. 9A–9D are waveform diagrams to which reference will be made in the explanation of the embodiment of FIG. 8.

With the arrangement of FIG. 8, when switch 5 is turned on or closed at the time $t_o$ and opened at the time $t_6$, a pulse signal 33*a* (FIG. 9A) is supplied to the base of transistor 29 to provide, at the collector of transistor 29, a pulse signal 33*b* (FIG. 9B) which is opposite in polarity to the aforementioned pulse signal 33*a*. The pulse signal 33*b* is differentiated by capacitor 30 and resistor 31 to supply the base of the transistor 32 with a differentiated signal, such as in shown in FIG. 9C. When a positive differentiated signal 33*c*, produced at the time $t_6$ when switch 5 is opened, is supplied to the base of transistor 32, this transistor 32 becomes conductive to instantaneously discharge the charge stored in capacitor 12 through the collector and emitter of transistor 32, as shown in FIG. 9D.

Thus, in the embodiment of FIG. 8, the entire charge stored in capacitor 12 can be discharged instantaneously to obtain control signals of predetermined durations even when the switches 3,4 and 5 are operated successively with little or no delay therebetween.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of this invention.

What is claimed is:

1. An apparatus for transmitting signals, comprising a voltage source for providing a DC operating voltage, oscillator means for generating a predetermined signal, a first transistor having first, second and third electrodes, means connecting said first transistor between said voltage source and said oscillator for supplying said DC operating voltage to said oscillator means through said first and second electrodes, selectively operable switching means connected to said third electrode of said first transistor, charging means connected to said switching means and having its charging time constant selectively determined by operation of said switching means, and a second transistor connected between said oscillator means and said charging means and being controlled by said charging means so as to set said oscillator means to produce desired signals in accordance with said charging time constant.

2. An apparatus for transmitting signals in accordance with claim 1, in which said voltage source consists of a battery.

3. An apparatus for transmitting signals in accordance with claim 1, in which said charging means comprises a capacitor and a plurality of resistors connected in series, and said switching means includes a plurality of switches each connected between the third electrode of said first transistor and a respective one of the junctures between said resistors.

4. An apparatus for transmitting signals in accordance with claim 3, in which said third electrode of the first transistor is a base electrode and said switches are connected in parallel to each other.

5. An apparatus for transmitting signals in accordance with claim 4, in which said capacitor is charged by a base current of said first transistor through a selected one of said switch and at least one of said resistors, and said second transistor is turned on to terminate operation of said oscillator means in response to the charging of said capacitor up to a predetermined potential.

6. An apparatus for transmitting signals in accordance with claim 3, further comprising discharging means for discharging an electric charge stored in said capacitor in accordance with operation of said switches.

7. An apparatus for transmitting signals in accordance with claim 6, in which said capacitor is charged when any one of said switches is closed and caused to discharge by said discharging means when all of said switches are opened.

8. An apparatus for transmitting signals in accordance with claim 7, in which said discharging means comprises additional switching means operated in response to the operation of said switches connected to said first transistor.

9. An apparatus for transmitting signals in accordance with claim 8, in which said additional switching means is connected in parallel with said capacitor.

10. An apparatus for transmitting signals in accordance with claim 7, in which said discharging means includes a third transistor forming a discharging path for electric charge of said capacitor when all of said switches are open.

11. An apparatus for transmitting signals in accordance with claim 1, in which said oscillator means is operative to generate a constant frequency signal and controlled by said second transistor so as to determine the duration of generation of said signal in response to the charging time constant of said charging means.

12. An apparatus for transmitting control signal, comprising a voltage source for providing a DC operating voltage, oscillator means for generating a signal of a predetermined frequency, a switching transistor interposed between said source and said oscillator means to apply said operating voltage to the latter only when said switching transistor is turned on, selectively operable mechanical switching means connected with said switching transistor to turn on the latter in response to operation of said mechanical switching means, charging circuit means connected with said mechanical switching means and including a capacitor which is charged with a charging time constant determined by the selective operation of said mechanical switching means, and a control transistor connected between said charging circuit means and said oscillator means to cause operation of the latter only during the charging of said capacitor up to a predetermined potential, whereby the duration of a signal generated by said oscillator means is dependent upon said charging time constant determined by the selective operation of said mechanical switching means.

13. An apparatus for transmitting control signals according to claim 12, further comprising means operable following a selective operation of said mechanical switching means to effect discharge of said capacitor.

* * * * *